United States Patent [19]

Izumi

[11] Patent Number: 4,500,941
[45] Date of Patent: Feb. 19, 1985

[54] CERAMIC TRIMMER CAPACITOR

[75] Inventor: Hiroshi Izumi, Tamayama, Japan

[73] Assignee: Alps Electric Co., Ltd., Tokyo, Japan

[21] Appl. No.: 341,097

[22] Filed: Jan. 20, 1982

[30] Foreign Application Priority Data

Jan. 27, 1981 [JP] Japan .................. 56-9905[U]

[51] Int. Cl.³ .................................. H01G 5/04
[52] U.S. Cl. .................................. 361/293
[58] Field of Search .......................... 361/293

[56] References Cited

U.S. PATENT DOCUMENTS 3,336,629  8/1967  Matsui ..................... 361/293
3,588,642  6/1971  Fabricius .................. 361/293
4,101,951  7/1978  Kuze ....................... 361/293

Primary Examiner—Donald A. Griffin
Attorney, Agent, or Firm—Guy W. Shoup; Gerard F. Dunne

[57] ABSTRACT

Disclosed is a ceramic trimmer capacitor comprising a ceramic board having a substantially semi-circular stator electrode formed on one surface thereof, which is pressed and gripped between a rotor member composed of a metal and an insulating frame, wherein a plurality of arcuate convex portions are formed on the frame on the surface thereof having abutting contact with the ceramic board so that the periphery of the rotor member is supported by the arcuate convex portions. In this ceramic trimmer capacitor, the reliability of the stability against cracking of the ceramic board and the dependency characteristic of the electrostatic capacitance on the rotor load are highly improved.

3 Claims, 5 Drawing Figures

CERAMIC TRIMMER CAPACITOR

BACKGROUND OF THE INVENTION (1) Field of the Invention

The present invention relates to a ceramic trimmer capacitor. More particularly, the present invention relates to a ceramic trimmer capacitor in which the reliability against cracking of the ceramic board used as a dielectric member and the dependency of the electrostatic capacitance on the rotor load are improved.

(2) Description of the Prior Art

A typical example of a conventional trimmer capacitor is first described with reference to FIGS. 1 through 3 of the accompanying drawings.

Referring to FIG. 1, a disc-shaped rotor member 1 is formed by die casting of zinc or the like, and on the bottom of the rotor member 1, there is formed a substantially semicircular rotor electrode 1a, and a semi-annular convex portion 1b having the same height as that of the rotor electrode 1a is formed and projected on the bottom of the rotor member 1 so that a good balance is maintained between the rotor electrode 1a and the convex portion 1b on the bottom of the rotor member 1 (see FIG. 2). A thin ceramic board 3 acting as a dielectric member has a substantially oval shape (see FIG. 2) and a substantially semi-circular stator electrode 7 is formed on one surface of the ceramic board 3 by printing with a silver paste or the like. A frame 4 formed from an insulating synthetic resin has a substantially cup-like shape and a hot terminal 5 formed of a thin metal plate is attached to the bottom 4f of the frame 4 by insertion molding, press fitting or the like. One end of the hot terminal 5 is bent in a fine groove 4g formed (see FIGS. 1 and 3) on the inner bottom face 4a of the frame 4 to form a resilient contact portion 5a. As shown in FIG. 3, a linear portion 4c and an arcuate portion 4h are formed on the inner circumferential face of the peripheral wall 4b of the frame 4.

The ceramic board 3 is placed on the inner bottom face 4a of the frame 4 so that the stator electrode 7 is directed downward and the linear side portion 3a of the ceramic board 3 is fitted in the linear portion 4c of the frame 4 to hold, the ceramic board 3 immobile. The contact portion 5a of the hot terminal 5 resiliently engages the stator electrode 7 to provide electric conduction between the hot terminal 5 and the stator electrode 7. The rotor member 1 is placed on the ceramic board 3 so that the rotor electrode 1a and the semi-annular convex portion 1b are directed downward.

A metal shaft 2 has a head 2a thereof abutting against the bottom of a driver groove 1c of the rotor member 1, and the other end 2b of the metal shaft 2 is inserted through the rotor member 1, ceramic board 3 and frame 4 and projected outside from the bottom 4f of the frame 4 and, the other end 2b of the metal shaft 2 is caulked to the bottom 4f of the frame 4 through a grounding terminal 6. The rotor member 1 is rotatably supported on the frame 4 by means of the shaft 2 and simultaneously, the ceramic board 3 is pressed and gripped between the rotor member 1 to the inner bottom face 4a of the frame 4 by means of the shaft 2. Furthermore, the rotor member 1 is electrically connected to the grounding terminal 6 through the shaft 2.

When the rotor member 1 is rotated by an adjustment tool such as a screwdriver, the confronting area of the rotor electrode 1a of the rotor member 1 and the stator electrode 7 is changed to appropriately adjust the capacitance of the capacitor.

In the conventional trimmer capacitor having the above-mentioned structure, in order to reduce the manufacturing cost, an inexpensive synthetic resin material inevitably is used for the frame 4, and the formation of sink marks or warping is often caused on the inner bottom face 4a of the frame 4 because of molding shrinkage, resulting in reduction of the evenness of the inner bottom face 4a. Furthermore, since the stator electrode 7 is formed on the ceramic board 3 by printing or the like, the ceramic board 3 has a difference in thickness corresponding to the thickness of the stator electrode 7 and therefore, a gap that cannot practically be neglected is inevitably present between the ceramic board 3 and the inner bottom face 4a of the frame 4. Accordingly, at the step of caulking the shaft 2 or at the time of applying a pressing load onto the rotor member 1 for adjustment of the capacitance, the ceramic board 3 is irregularly distorted and the degree of the closeness between the ceramic board 3 and the rotor member 1 is degraded, resulting in variation of the capacitance. Namely, the dependency characteristic of the electrostatic capacitance on the rotor load is degraded, which is one of the defects of the conventional ceramic trimmer capacitor. Furthermore, the distortion is increased with increase of the rotor load, and since a bending force is imposed on the ceramic board 3, it sometimes happens that the ceramic board 3 breaks. This is another fatal defect of the conventional ceramic trimmer capacitor.

As a means for eliminating the foregoing defects, a structure in which an annular convex portion is formed integrally on the outer periphery of the inner bottom face 4a of the frame 4 so that only the periphery of the ceramic board 3 is supported by this annular convex portion (see Japanese Utility Model Application No. 161199/80) has been proposed. In this ceramic trimmer capacitor, good improvement in the stability against cracking of the ceramic board and the dependency of the static capacitance on the pressing load can be attained. However, in this proposed ceramic trimmer capacitor, since the annular convex portion has an annular shape covering 360°, some sink marks or warps are formed on the surface of the annular convex portion by molding shrinkage of the frame 4. Accordingly, if the thickness of the ceramic board 3 is reduced, the reliability against cracking of the ceramic board under a pressing load is insufficient to some extent and it is impossible to sufficiently improve the dependency characteristic of the electrostatic capacitance on the pressing load.

SUMMARY OF THE INVENTION

It is therefore a primary object of the present invention to provide a ceramic trimmer capacitor in which the foregoing defects of conventional ceramic trimmer capacitors are eliminated and the reliability of the capacitor is greatly improved.

In accordance with the present invention, there is provided a ceramic trimmer capacitor which comprises a ceramic board, a substantially semi-circular stator electrode formed on one surface of the ceramic board, a rotor member composed of a metal, and an insulating frame. The ceramic board is pressed and held between said rotor member and said insulating frame, by a plurality of arcuate convex portions formed on the frame surface and abutting the ceramic board so that the periphery of the rotor member is supported by said arcuate convex portions.

BRIEF DESCRIPTION OF THE DRAWINGS

FIGS. 1 through 3 are diagrams illustrating a conventional ceramic trimmer capacitor, in which FIG. 1 is a view showing the entire section taken along the line A—A in FIG. 3, FIG. 2 is a perspective view showing a rotor member and a ceramic board and FIG. 3 is a top plan view showing a frame.

FIGS. 4 and 5 are diagrams illustrating one embodiment of the ceramic trimmer capacitor according to the present invention, in which FIG. 4 is a view showing the entire section taken along the line B—B in FIG. 5, and FIG. 5 is a top plan view showing a frame.

DETAILED DESCRIPTION OF THE PREFERRED EMBODIMENT

Figure 1:
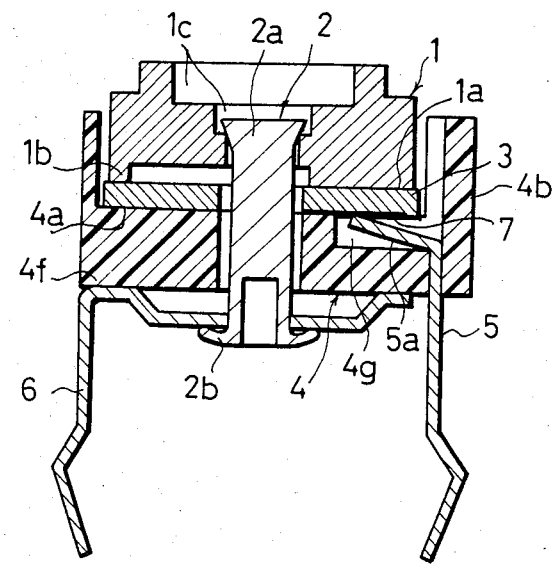
Figure 2:
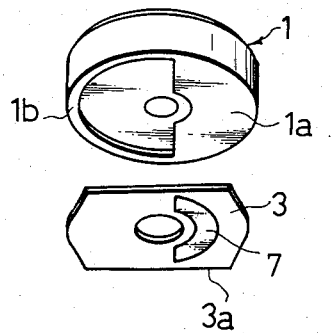
Figure 3:
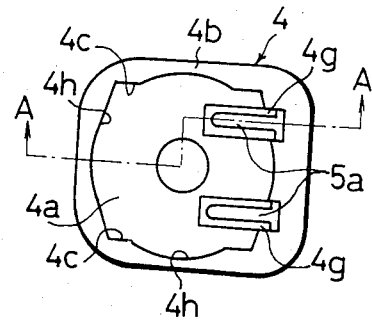

The present invention will now be described in detail with reference to an embodiment illustrated in FIGS. 4 and 5 of the accompanying drawings. Members having the same structure as in the above-mentioned conventional ceramic trimmer capacitor are indicated by the same reference numerals and detailed explanation of these members is omitted.

Figure 4:
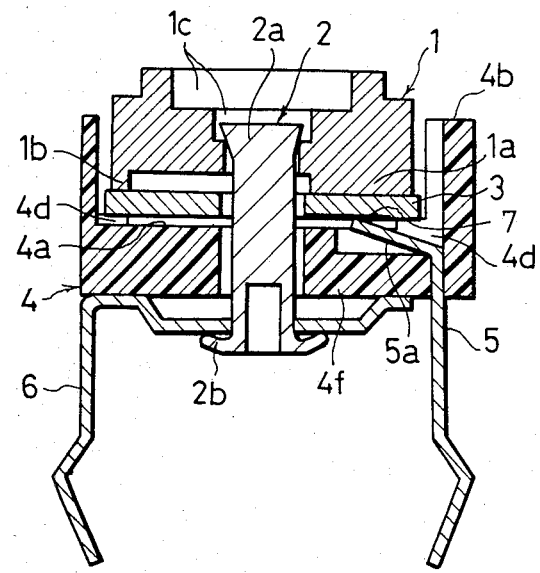
Figure 5:
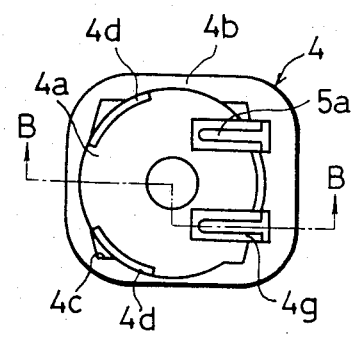

In the embodiment of the present invention illustrated in FIGS. 4 and 5, three arcuate convex portions 4d having a small width are integrally formed at intervals of about 120° on the peripheral surface of the inner bottom face 4a of the frame 4. The height of the convex portions 4d may be changed according to the thickness of a stator electrode 7, but ordinarily, if the thickness of the stator electrode 7 is about 10 to about 20µ, the height of the convex portions 4d is adjusted to about 30 to about 60µ. The convex portions 4d are positioned so as to be opposite the lower part of the outer periphery of a rotor member 1 and are prevented from coming into contact with the stator electrode 7 of the ceramic board 3. Furthermore, a plurality of the convex portions 4d are formed in a divided state, and therefore, they hardly undergo influences of molding shrinkage and gaps are not formed between the convex portions 4d and the ceramic board 3.

Accordingly, the outer peripheral portion of the ceramic board 3 is pressed and held by the arcuate convex portions 4d and the outer periphery of the rotor electrode 1a and the semi-annular convex portion 1b of the rotor member 1, and the convex portions 4d are closely contacted with the portions of the ceramic board 3 on which the stator electrode 7 is not formed (the precisely polished surface portion). Therefore, formation of a gap between the ceramic board 3 and frame 4 owing to the thickness (the level difference) of the stator electrode 7 is completely prevented. Furthermore, the ceramic board 3 is pressed and held by the arcuate convex portions 4d and the periphery of the lower part of the rotor member 1, not on the entire surface thereof but only on a plurality of parts of the peripheral portion thereof. Accordingly, the ceramic board 3 receives a compressive force only on the peripheral portion thereof and no substantial bending force is imposed on the ceramic board 3 (because a force causing deformation compulsorily according to irregular convexities and concavities is not applied), with the result that the reliability against cracking of the ceramic board 3 is improved and it becomes possible to reduce the thickness of the ceramic board 3. Moreover, the adhesion between the ceramic board 3 and the rotor member 1 (the rotor electrode 1a) is improved, and formation of a gap between the convex portions 4d and the ceramic board 3 is prevented. Therefore, the overall reliability of the stability against the pressing load can be improved very remarkably.

As is seen from the foregoing description, according to the present invention, since a structure is provided in which only the periphery of the ceramic board is pressed and held by a plurality of arcuate convex portions of the frame and the rotor member, a bending force due to the convexities and concavities on the entire inner bottom face of the frame and the thickness or level difference of the stator electrode is not imposed on the ceramic board at all and even a minute gap is not formed between these convex portions and the ceramic board. Accordingly, distortion of the ceramic board is prevented and the reliability of the stability against cracking of the ceramic board is highly improved over the above-mentioned previous proposal. Therefore, it becomes possible to further reduce the thickness of the ceramic board and a ceramic trimmer capacitor having a small size and a large capacitance can be provided according to the present invention. Still further, since there is no distortion of the ceramic board, the adhesion between the rotor member and the ceramic board is improved, and also the dependency of the electrostatic capacitance on the rotor load is improved. In summary, according to the present invention, ceramic trimmer capacitors having a high efficiency, a large capacitance and a small size can be prepared in a high yield. Therefore, the present invention makes great practical contributions to the art.

What is claimed is:

1. A ceramic trimmer capacitor comprising a ceramic board, a substantially semi-circular stator electrode formed on one surface of the ceramic board, a conductive rotor member, and an insulating frame having a surface for supporting said ceramic board; means including a plurality of arcuate portions spaced around said surface of said frame for engaging extreme peripheral portions of said ceramic board for holding said ceramic board between said rotor member and said insulating frame so that the periphery of said ceramic board is supported by said arcuate portions with minimal bending stresses being applied during loading of said rotor member.

2. A ceramic trimmer capacitor as set forth in claim 1, wherein a substantially semicircular rotor electrode is formed over half of the bottom face of the rotor member and a substantially semi-circular convex portion having the same height as that of said rotor electrode projects from the periphery of the remaining half region of the bottom face of the rotor member, and the ceramic board is pressed and held by said semi-annular projection, the peripheral portion of said rotor electrode and said arcuate portions of the frame.

3. A ceramic trimmer capacitor as set forth in claim 2, wherein a terminal resiliently contacts the stator electrode of the ceramic board so that the ceramic board is pressed down towards the rotor member.

* * * * *